United States Patent [19]

Dewitz

[11] Patent Number: 4,877,419
[45] Date of Patent: Oct. 31, 1989

[54] STRIPPING AND DEPRESSURIZATION OF SOLIDS AND GAS MIXTURE

[75] Inventor: Thomas S. Dewitz, Houston, Tex.

[73] Assignee: Shell Oil Company, Houston, Tex.

[21] Appl. No.: 98,180

[22] Filed: Sep. 18, 1987

[51] Int. Cl.$^4$ ................................................ C10J 3/84
[52] U.S. Cl. ...................................... 48/197 R; 55/1; 55/21; 252/373; 406/197
[58] Field of Search ............ 48/197 R, 210; 252/373; 55/1, 21, 68; 406/12, 14, 16, 93, 197

[56] References Cited

U.S. PATENT DOCUMENTS

| | | | |
|---|---|---|---|
| 4,017,269 | 4/1977 | Dutz et al. | 406/14 |
| 4,049,394 | 9/1977 | Gernhardt et al. | 406/12 |
| 4,455,154 | 6/1984 | Blasiole | 48/210 |
| 4,482,275 | 11/1984 | Shinozaki et al. | 406/12 |
| 4,516,989 | 5/1985 | Mink et al. | 55/1 |
| 4,613,344 | 9/1986 | Henrich et al. | 48/210 |
| 4,662,798 | 5/1987 | Fassbinder | 406/93 |
| 4,701,185 | 10/1987 | Eckstein | 55/1 |

OTHER PUBLICATIONS

EPRI Report AP-3129 (1983), p. 7-7.
Hydrocarbon Processing, 1984, (vol. 63, No. 4, p. 96).
EPRI Document AP-4680 (1985), pp. 7-6, 7-15.

Primary Examiner—Peter Kratz

[57] ABSTRACT

An apparatus and method for stripping and depressurizing fine particulates mixed with gas discharged from a vessel operated at elevated temperature and pressure conditions to a low pressure vessel using a purge gas injected into a conduit designed for significant frictional pressure loss per unit length of conduit while maintaining a substantially constant velocity of the mixture conveyed.

5 Claims, 2 Drawing Sheets

STRIPPING AND DEPRESSURIZATION OF SOLIDS AND GAS MIXTURE

RELATED APPLICATIONS

This application is related to Assignee's patent application Ser. No. 098,178 filed Sept. 18, 1987.

BACKGROUND OF THE INVENTION

Conventional systems for stripping and depressurizing a mixture of fine particulates mixed with gas, such as flyash mixed with synthetic gas, also referred to as syngas, from a vessel, such as a cyclone separator-stripper, operated at elevated temperature and pressure conditions usually employ either a throttling valve or a lockhopper following the separator-stripper to equalize the pressure between the separator-stripper and a low pressure receiving vessel as the mixture is discharged from the separator-stripper.

However, pressure surges created by the lockhopper in communication with the separator-stripper decrease the removal efficiency of the separator-stripper due to elutriation and reentrainment of flyash from the bed of the separator-stripper back into the synthetic gas. Additionally, throttling valves are subjected to rapid erosion.

The present invention is directed to overcoming these problems in the prior art.

Applicant is not aware of any prior art which, in his judgment as one skilled in this particular art, would anticipate or render obvious the present invention.

SUMMARY OF THE INVENTION

The primary purpose of the present invention relates to stripping and depressurizing fine particulates mixed with gas discharged from a vessel operated at elevated temperature and pressure conditions. In particular, this invention relates to stripping and depressurizing flyash mixed with syngas produced by a coal gasification reactor, hereinafter referred to as a gasifier.

Preferably, such an apparatus includes: means for receiving and conveying the mixture from the vessel, means for selectively injecting gas into the means for receiving and conveying the mixture, means for maintaining a substantially constant fraction of gas volume to particulates volume in the means for receiving and conveying the mixture, means for maintaining a higher pressure at the lower end of the means for receiving and conveying the mixture than the pressure of the vessel, and means for decreasing a pressure in the means for receiving and conveying the mixture.

Preferably, a method for accomplishing this stripping and depressuring includes: receiving and conveying the mixture from the vessel, selectively injecting gas into a means for receiving and conveying the mixture, maintaining a substantially constant fraction of gas volume to particulates volume in the means for receiving and conveying the mixture, maintaining a higher pressure at a lower end of the means for receiving and conveying the mixture than the pressure of the vessel, and decreasing a pressure in the means for receiving and conveying the mixture.

The various features of novelty which characterize the invention are pointed out with particularity in the claims forming a part of this disclosure. For a better understanding of this invention, its operating advantages and specific objects obtained by its uses, reference may be made to the accompanying drawings and descriptive matter in which there are illustrated preferred embodiments of the invention.

DESCRIPTION OF A PREFERRED EMBODIMENT

Figure 1:
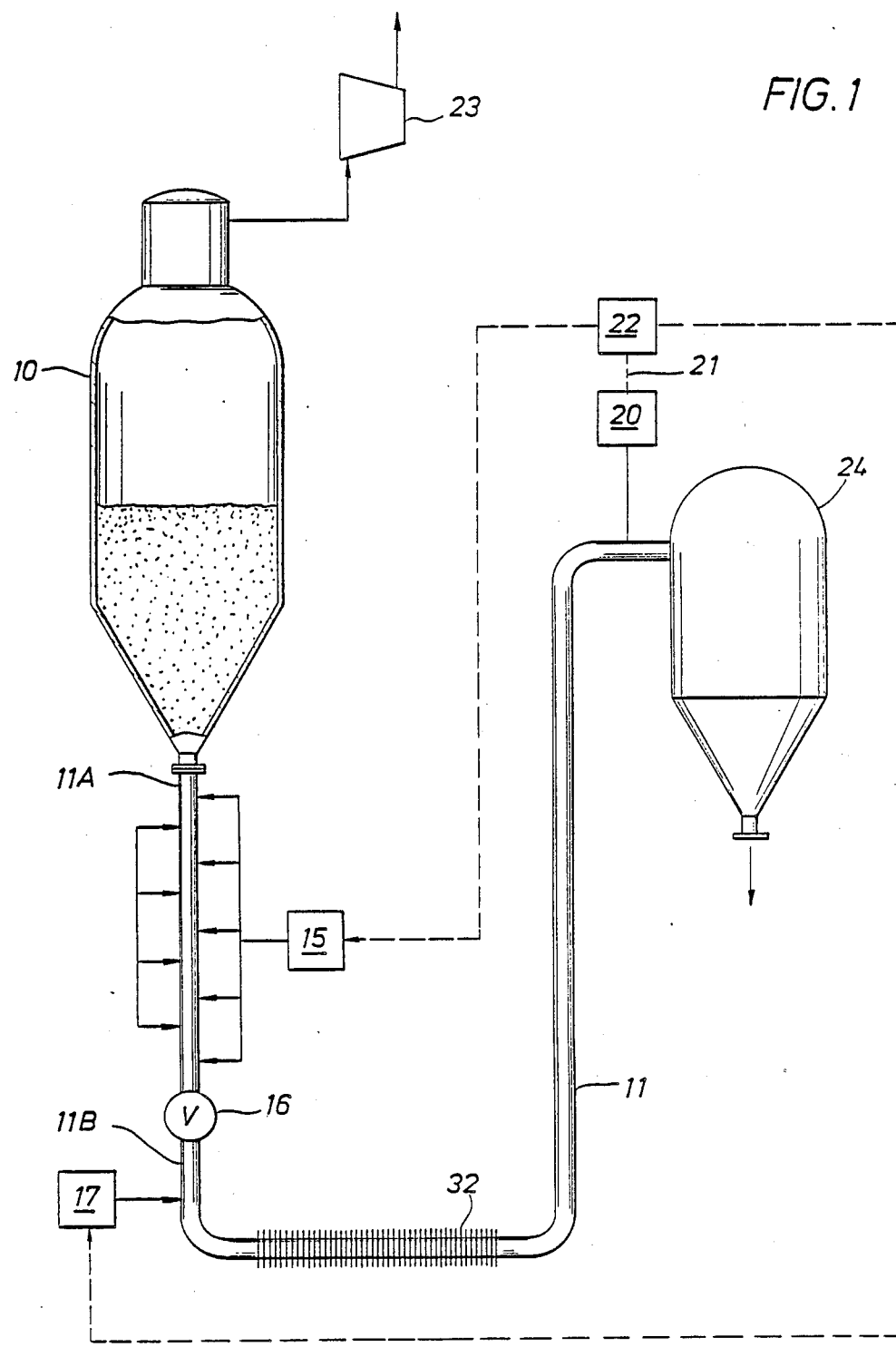
FIG. 1 illustrates an embodiment of the present invention.

Generation of synthesis gas occurs by partially combusting carbonaceous fuel, such as coal, at relatively high temperatures in the range of 800°–2000° C. and at a pressure range of from about 1–200 bar in the presence of oxygen or oxygen-containing gases in a gasifier. Oxygen-containing gases include air, oxygen-enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the resulting flame and the agents of combustion into the gasifier.

Gasification of coal produces a gas, known as synthesis gas or syngas, that contains mostly carbon monoxide and hydrogen. Also produced are varying quantities of other gases, such as carbon dioxide and methane, and various liquid and solids materials, such as small particles of ash and carbon commonly known and collectively defined herein as flyash or flyslag. This flyash, because it is derived from a "reducing" atmosphere, tends to be different in composition and properties from flyash normally associated with combustion boilers where a fully oxidizing atmosphere is utilized. For example, the flyash from the process for partially combusting coal may contain elemental iron, sulfides, and deposited carbon, components not normally associated with boiler flyash.

The present invention is particularly related to stripping and depressurizing a fine particulate flyash solids and synthesis gas mixture discharged from a cyclone separator-stripper to a tertiary treating device, such as a bag filter. Because the separator-stripper is operated at elevated temperatures, say 250° C., and pressure, say 400 psig, a lockhopper device or throttling valve typically follow the separator-stripper to equalize the pressure between the separator-stripper and a low pressure vessel. However, pressure surges in the lockhopper tend to decrease the solids removal efficiency of the separator-stripper as previously mentioned. Additionally, throttling valves are subjected to rapid erosion and plugging. Both lockhoppers and throttling valves interrupt the flow of the flyash solids and synthesis gas mixture so as to allow defluidization and bridging of the flyash solids. Since the "clean" stream from the separator-stripper may be recycled to power recovering means, such as a compressor or turbine, the efficiency of solids removal by the separator-stripper is very important to prevent corrosion of such power recovering equipment.

An advantage of the present invention is the capability of depressurizing a fine particulate and gas mixture from a vessel operated at elevated temperature and pressure conditions without the use of a lockhopper or throttling valve following the separator-stripper.

A further advantage of the present invention is minimizing pressure surges of the separator-stripper which enhances the solids removal efficiency of the separator-stripper.

An additional advantage of the present invention is the elimination of multiple vaves in erosive/corrosive service.

Another advantage of the present invention is the maintaining of a continuous flow of solids which prevents defluidization and/or bridging of the flyash solids.

Although the invention is described hereinafter primarily with reference to pulverized coal and a gasifier, the method and apparatus according to the invention are also suitable for catalysts and other finely divided reactive solids which could be partially combusted, such as lignite, anthracite, bituminous, brown coal, soot, petroleum coke, and the like. Preferably, the size of solid carbonaceous fuel is such that 90 percent by weight of the fuel has a particle size smaller than No. 6 mesh (A.S.T.M.).

Having thus generally described the apparatus and method of the present invention, as well as its numerous advantages over the art, the following is a more detailed description thereof, given in accordance with specific reference to the drawings. However, the drawings are of process flow type in which auxiliary equipment, such as pumps, compressors, cleaning devices, etc. are not shown. All values are merely exemplary or calculated.

Referring to FIG. 1 of the drawing, an apparatus and method for stripping and depressurizing fine particulates mixed with gas discharged from a vessel, such as a separator-stripper 10, operated at elevated temperature and pressure conditions generally includes means for receiving and conveying the mixture, say conduit 11, extending downwardly from the separator-stripper 10 and having upper and lower ends 11A and 11B, respectively.

Gas, preferably an inert gas such as nitrogen, from a source 15 is injected under pressure into the conduit 11, preferably at more than one location as is shown in FIG. 1 to purge or strip entrained synthesis gas from the flyash and to maintain fluidization of the flyash in the conduit 11. The location of the injection points along the conduit 11 are based on the suspension density of the flyash solids and gas mixture and the fluidization properties of the flyash.

A substantially constant fraction of gas volume to particulates volume is maintained in the conduit 11 by controlling either the mass flow rate of the mixture discharged from the conduit 11 or the back pressure at point 11B.

It is desirable to control the mass flow rate of the mixture discharged from the conduit 11 to control the inventory of flyash solids in the separator-stripper 10 and to monitor the amount of flyash produced.

The mass flow rate of the mixture discharged from the conduit 11 to a low pressure receiving vessel 24 is preferably controlled by determining the mass flow rate of the mixture using a mass flow rate meter 20, such as a meter manufactured by Auburn International Co., transmitting a signal, shown for ease of illustration in FIG. 1 as dashed line 21 to a processor-controller 22, comparing the determined mass flow rate with a preselected mass flow rate using controller 22, and adjusting the mass flow rate such as by transmitting a signal from the controller 22 to gas source 15 to adjust the rate of gas injected into conduit 11.

Alternatively, the mass flow rate of the mixture can be adjusted by changing the injection rate of transport gas from source 17 and thus, controlling the back pressure at point 11B.

A higher pressure, say 405 psig, is maintained at the lower end 11B of the conduit 11 than the pressure of the separator-stripper 10, by either actuating a sluicing valve 16 at the lower end 11B of the conduit 11 or using a backpressure controller 31 (FIG. 2) to regulate the injection of transport gas from source 17 to maintain a gas seal in conduit 11A. Maintaining a higher pressure at the lower end 11B of the conduit 11 is important to prevent the contamination of the separated flyash with the clean synthesis gas which is used to drive a power-recovery means 23 such as a turbine or compressor for example.

Additionally, injection of pneumatic transport gas from source 17 into conduit 11 prevents plugging in the conduit.

The pressure of the flyash and gas mixture is decreased beginning at the lower end 11B of the conduit 11 by friction distributed uniformly over the designated length of the conduit 11.

This mechanism for decreasing the pressure in the conduit 11 is preferred to other conventional depressuring mechanisms such as lockhoppers, throttling valves, or orifices for the reasons previously mentioned.

Depressurization of the flyash solids and gas mixture in the conduit 11 occurs because the conduit 11 beginning at the lower end 11B thereof is designed (by its increasing diameter) to maintain a substantially constant velocity of the mixture travelling through the conduit while providing a significant frictional pressure loss per unit length of conduit at an acceptable erosion rate of the conduit. Typical velocities of about 200 ft/sec are sufficient to lower the pressure from about 350 psig to 30 psig in about 10 feet of conduit with acceptable erosion of the conduit.

Additionally, the temperature of the mixture can be lowered using cooling fins 32 or in any other manner well known to the art.

Figure 2:
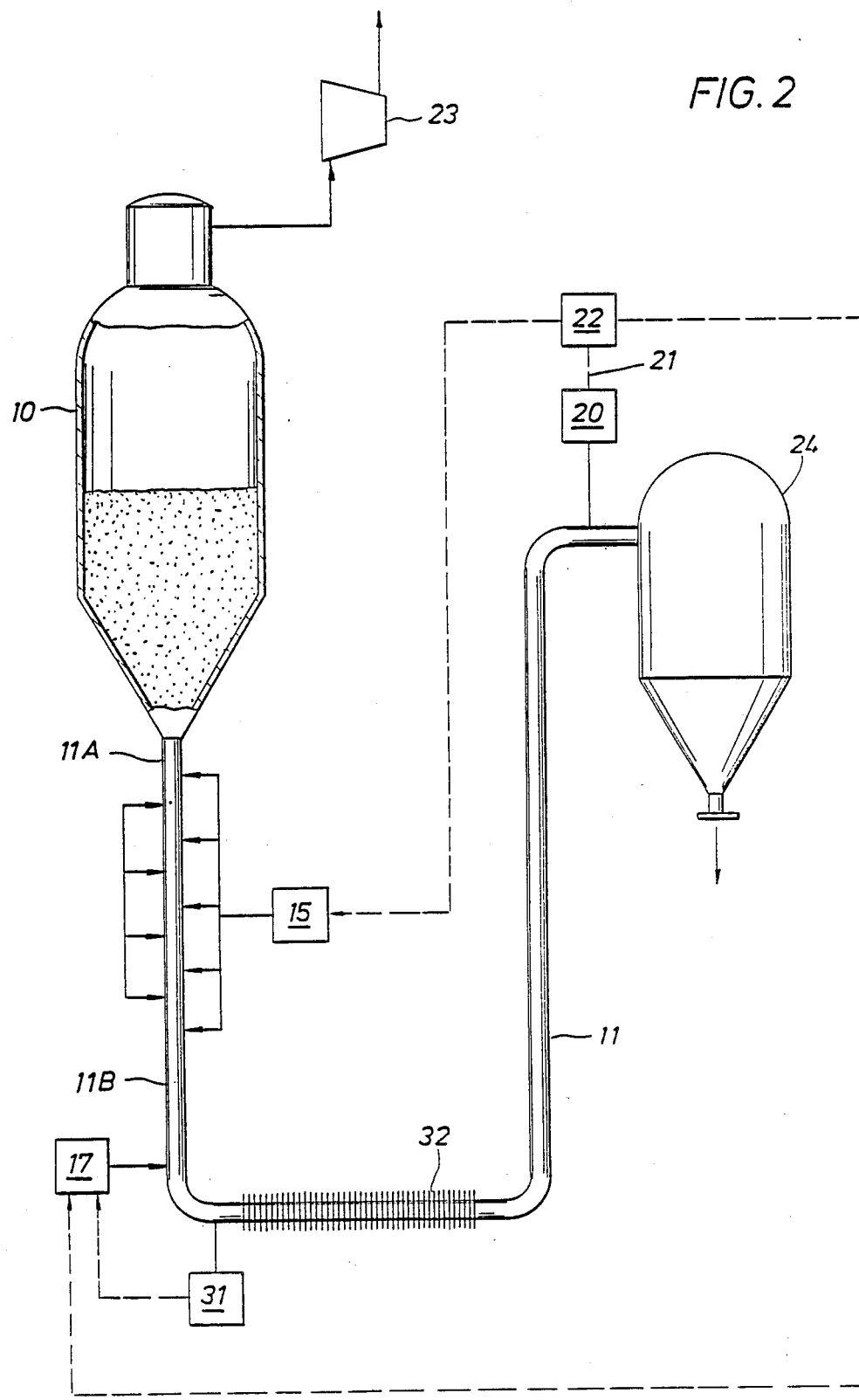
FIG. 2 illustrates an alternate embodiment of the present invention.

Although the system for the present invention is shown in FIGS. 1 and 2 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system, it is also understood by those skilled in the art that the present invention could be effected using manual or pneumatic controls.

The foregoing description of the invention is merely intended to be explanatory thereof, and various changes in the details of the described method and apparatus may be made within the scope of the appended claims without departing from the spirit of the invention.

What is claimed is:

1. A method for stripping and depressurizing fine particulates mixed with gas discharged from a vessel operated at elevated temperature and pressure conditions, said method comprising the steps of:

receiving and conveying said mixture from said vessel;

stripping said particulates of entrained synthesis gas by selectively injecting gas into a means for receiving and conveying said mixture from said vessel;

maintaining a substantially constant fraction of gas volume to particulates volume in said means for receiving and conveying said mixture;

maintaining a higher pressure at a lower end of said means for receiving and conveying said mixture than the pressure of said vessel, said maintaining a higher pressure includes actuating valving means located at a lower portion of said means for receiving and conveying said mixture;

decreasing the pressure in said means for receiving and conveying said mixture downstream from said lower end, said decreasing the pressure includes gradually increasing the diameter of said means for receiving and conveying said mixture downstream from said lower end;

controlling the mass flow rate of said mixture discharged from said means for receiving and conveying said mixture, said controlling includes determining the mass flow rate of said mixture downstream of said selectively injecting gas into said means for receiving and conveying said mixture, comparing said mass flow rate with a preselected mass flow rate, and adjusting said mass flow rate.

2. A method for stripping and depressurizing fine particulates mixed with gas discharged from a vessel operated at elevated temperature and pressure conditions, said method comprising the steps of:

receiving and conveying said mixture from said vessel;

stripping said particulates of entrained synthesis gas by selectively injecting gas into a means for receiving and conveying said mixture from said vessel;

maintaining a substantially constant fraction of gas volume to particulates volume in said means for receiving and conveying said mixture;

maintaining a higher pressure at the lower end of said means for receiving and conveying said mixture than the pressure of said vessel;

decreasing the pressure in said means for receiving and conveying said mixture downstream from said lower end; and discharging said mixture from said means for receiving and conveying said mixture at a location downstream from said lower end.

3. The method of claim 2 wherein said maintaining a higher pressure includes actuating valving means located at the lower portion of said means for receiving and conveying said mixture.

4. The method of claim 2 wherein said decreasing the pressure includes gradually increasing the diameter of said means for receiving and conveying said mixture.

5. The method of claim 2 further including the steps of controlling the mass flow rate of said mixture discharged from said means for receiving and conveying said mixture, said controlling includes determining the mass flow rate of said mixture downstream of said selectively injecting gas into said means for receiving and conveying said mixture, comparing said mass flow rate with a preselected mass flow rate, and adjusting said mass flow rate.

* * * * *